Figure 1:
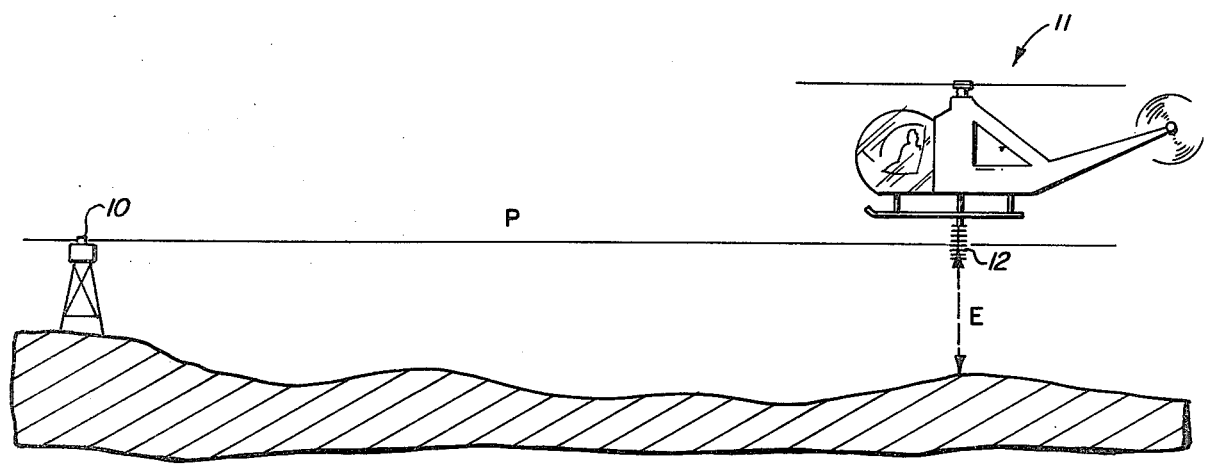

United States Patent [19]

Boulais

[11] 4,203,665
[45] May 20, 1980

[54] AERIAL SURVEYING METHOD TO DETERMINE GROUND CONTOURS

[75] Inventor: Richard A. Boulais, Phoenix, Ariz.

[73] Assignee: Laser Systems, Inc., Phoenix, Ariz.

[21] Appl. No.: 3,704

[22] Filed: Jan. 15, 1979

[51] Int. Cl.² .................. G01C 3/08; G01B 11/26
[52] U.S. Cl. ........................................ 356/4; 356/1;
356/152; 356/400
[58] Field of Search .............. 356/1, 4, 152, 400;
343/5 CM

[56] References Cited

U.S. PATENT DOCUMENTS

| | | | |
|---|---|---|---|
| 3,736,058 | 5/1973 | Iadarola | 356/4 |
| 3,765,770 | 11/1973 | McConnell et al. | 356/4 |
| 3,766,312 | 10/1973 | McConnell et al. | 356/4 |
| 3,846,026 | 11/1974 | Waters | 356/152 |
| 3,894,230 | 7/1975 | Rorden et al. | 356/400 |
| 3,918,172 | 11/1975 | Moreau | 356/1 |

FOREIGN PATENT DOCUMENTS 1399441  7/1975  United Kingdom ............... 356/152

Primary Examiner—S. C. Buczinski
Attorney, Agent, or Firm—William H. Drummond

[57] ABSTRACT

An aerial surveying method to determine ground contour utilizes a rotating laser beam to establish a horizontal reference plane to which all contour measurements are referred. A stacked-array optical sensor, suspended below the aircraft, is utilized to measure the relative height of the aircraft with respect to the reference plane. A survey track along the ground for the aircraft is determined and the position of the aircraft along the track is continuously measured. The aircraft is flown continuously along the track and repeated altitude measurements of the aircraft are continuously made. The relative height of the aircraft with respect to the laser beam, the altitude of the aircraft above the ground and the position of the aircraft along the survey track are correlated to determine the ground contours.

1 Claim, 2 Drawing Figures

U.S. Patent        May 20, 1980        4,203,665

AERIAL SURVEYING METHOD TO DETERMINE GROUND CONTOURS

The invention relates to an improved method for aerial surveying.

In another respect, the invention relates to an aerial surveying method which establishes a horizontal reference plane, from which reference plane all ground contours are determined.

In a more specific respect, the invention relates to an aerial surveying method which utilizes electromagnetic transmission and receiving devices to establish a horizontal reference plane from which ground contours are determined.

In an important respect, the invention relates to an aerial surveying method utilizing a laser beam to define a horizontal reference plane from which ground contours are determined.

In a further important respect, the invention relates to an aerial surveying method having an embodiment which utilizes an optical radar to define the horizontal reference plane from which ground contours are determined.

The prior art holds many examples of aerial surveying techniques assisted by equipment on the ground. Both U.S. Pat. No. 3,918,172 and British Pat. No. 1,399,441 disclose a laser-assisted helicopter surveying scheme by which a laser beam is used to mark the hover position of a helicopter and then telemetry is used to locate the craft and thus the location of the laser source. Conventional surveying techniques are utilized in conjunction with the hovering position of the helicopter as a reference.

The patents to Alpers U.S. Pat. No. 3,213,451 and to Lustig U.S. Pat. No. 3,191,170 are basically radar systems, though Lustig makes use of a compensated barometric altimeter by which he attempts to maintain the aircraft at a constant reference altitude during the course of the aircraft's flight.

Suzaki U.S. Pat. No. 3,817,620 combines triangulation and transit times to determine the location of both an aircraft and undetermined earth locations with respect to known earth locations.

In U.S. Pat. No. 3,743,418, Heflinger obtains a contour map comprised of light and dark contour lines. He illuminates the ground with pulses of light. He views the reflected light through a shutter synchronized to the light pulses. Reflected light is admitted or rejected at the shutter dependent upon the round-trip transit time of the light. The accuracy of this contour plot will depend upon the control of the pilot in maintaining altitude and, unless other equipment is added, the pilot will have no knowledge of the actual elevation of his contour lines.

None of the known prior art establishes a reference plane in space to which the ground contour measurements made from the aircraft may be referenced. It is therefore an object of the present invention to not only locate the aircraft in space but to correlate with that determined location its altitude relative to a horizontal plane of reference.

It is a further object of the invention to provide a method utilizing ground-based equipment which will establish in space the horizontal reference plane and which will cooperate with airborne equipment to correlate aircraft altimeter readings and spacial locations.

It is a particular object of the invention in one of its embodiments to utilize a rotating laser light beam to define the horizontal reference plane to which ground contour measurements are referred.

It is a particular and specific object of the invention to provide an aerial surveying method which utilizes equipment which is simple, rugged and economical yet highly accurate and convenient to use by both ground and aircraft personnel.

In summary description, the invention is an aerial surveying method to establish ground contours. In one embodiment, a rotating laser beam is utilized to establish a horizontal reference plane to which all contour measurements are referred. An optical sensor comprising a stacked array of light detectors is suspended below the aircraft. The detectors are stacked to the extent that the sensor array reaches a length consistent with typical pilot-ability limitations for flying a level course. For example, if the aircraft used is a helicopter, an optical sensor comprised of a three-foot-long array of light detectors would meet the above requirement. At the time the rotating laser beam intersects the aircraft's optical sensor, synchronized readings of which light detector in the array was energized and of an accurate altimeter output are recorded. The location of the aircraft is simultaneously tracked and recorded, using either a radio base line position-determining system or by triangulation using a second rotating laser beam. In the latter case, the beams are modulated, both for identification and to prevent interference from other laser users in the vicinity. The rotary angular position of the beams are recorded at the same time the altimeter and light detector readings are made.

Figure 2:
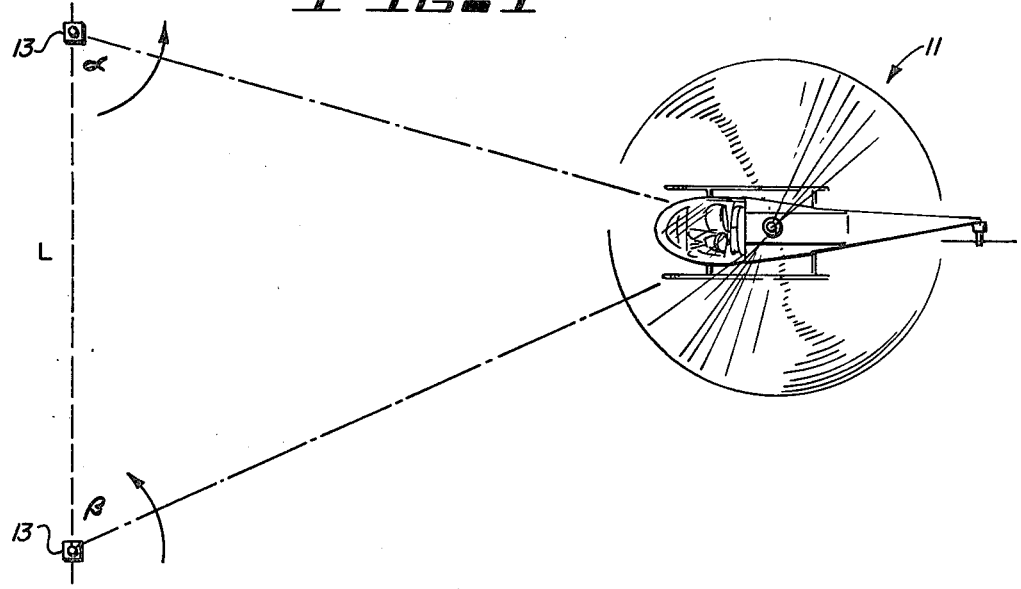

These and other objects and advantages of the invention will be apparent to those skilled in the art from the following detailed description thereof, taken in conjunction with the drawings, in which:

FIG. 1 illustrates the basic method concept and embodiment utilizing a laser transmitter to establish a horizontal reference plane containing the laser light beam output by said transmitter, which light beam is intercepted by an optical sensor on an aircraft here illustrated as a helicopter; and FIG. 2 is an illustration of the manner in which two signals on the ground may be utilized for triangulation pruposes to determine the position of the surveying aircraft.

The basic concepts of the method which utilizes laser-assisted survey system are illustrated in FIG. 1. Here laser beam generator 10 is established so as to radiate energy in a horizontal plane, indicated in FIG. 1 as line P. An aircraft, here indicated as helicopter 11, is equipped with a stacked array 12 of optical sensors. The pilot of helicopter 11 maneuvers the aircraft so as to maintain optical sensor stack 12 at an altitude which assures that optical stack 12 will intersect the plane P of the laser beam generated by laser generator 10. With manual flight control, a competent pilot may easily maintain the required intersection of the optical stack 12 and laser plane P if the optical stack 12 is on the order of three-feet long.

Figure 3:
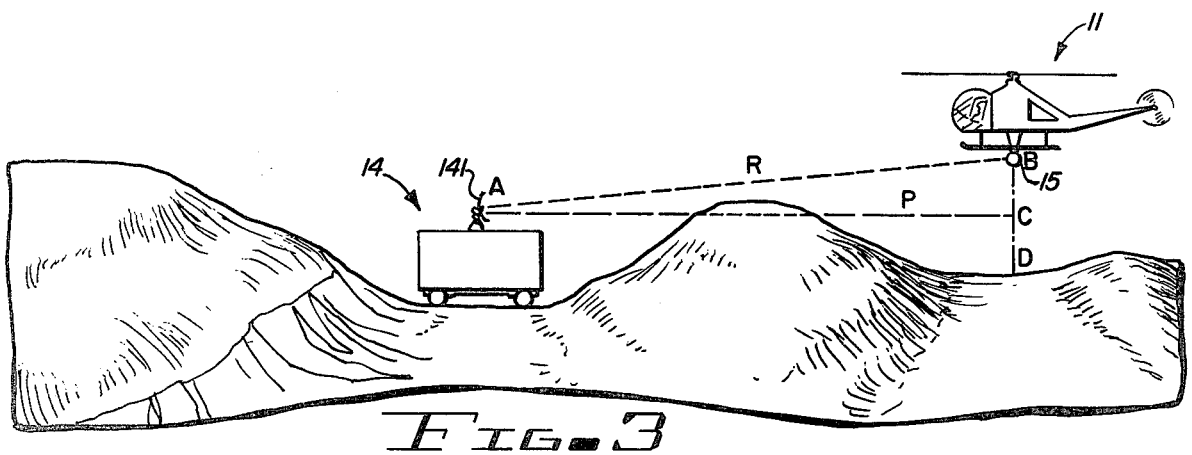

Such optical sensor stacks are well known to the prior art. See, for example, U.S. Pat. No. 3,887,012 issued to Scholl et al June 3, 1975, with particular reference to FIGS. 2 and 3. With such a stack array, it is possible to detemine which sensor in the stack is being energized at any given instant of time. Such information may be utilized to provide the pilot with elevation trim data as well as providing a correlation between the aircraft's altimeter measuring head and reference plane P. The latter data are important in eliminating the short-term variations in elevation as aircraft 11 moves over the survey area. The need for accounting for such relatively small variations in altitude will be recognized where accurate ground contours are desired in light of the fact that present day aircraft altimeters are capable of measuring aircraft terrain clearance within a tolerance of plus or minus three inches. Means are provided within aircraft 11 such that the instantaneous altitude reading is determined at the moment the rotating laser beam generated by laser transmitter 10 intersects a sensor in optical stack 12. This instantaneous altimeter reading is then automatically corrected by equipment within the aircraft to provide the instantaneous elevation E to reference plane P. The techniques and apparatus for making such corrections and correlations are well known in the prior art as may be realized when one considers oceanographic surveying techniques in which the ocean depths are determined with corrections being made for the displacement of the fathometer head from the surface of the water and for periodic variations in the water levels from mean average levels.

To meaningfully survey an area, a survey track pattern must be established over the area and the instantaneous elevation readings E correlated with the instantaneous location of the aircraft along the survey track. Base line triangulation techniques, as illustrated in FIG. 2, are well known in the prior art. Basically, at least two angle-determining devices 13 are located a known distance apart along an established base line L. With the base line distance known and the line-of-sight angular dispositions alpha and beta determined, simple trigonometric relationships are applied to determine the location of the aircraft 11. Modern electronic positioning systems provide the means to quickly, easily and inexpensively permit a pilot to determine exactly where to start on a survey track, enable him to maintain his course, and permit him to establish exactly where he broke track should he have to interrupt his survey flight.

The Mini-Ranger (TM) III position-determining system by Motorola Incorporated of Scottsdale, Arizona is an electronic positioning system such as noted above. The lightweight, low-power Mini-Ranger system uses a small receiver/transmitter installed in the aircraft. This receiver/transmitter works with two or more portable battery-operated reference stations located at known points near the survey site. The system measures distances to the unattended reference stations, automatically computes the location of the aircraft, and then outputs course error data to the pilot on an indicator which allows accurate steering control. In operation, a pilot can quickly establish a survey flight pattern suited to the area to be covered. He can then methodically cover this area without the uncertainty of skips or overlaps, and he can break track and return to the survey area without losing survey track position. Equipment of this type provides a suitable adjunct to the invention taught herein.

With the increased field use of laser systems for purposes other than that disclosed herein, it would be advisable to modulate the laser light beam transmitted by laser light generator 10 so as to preclude the possibility of extraneous laser signals interfering adversely with the ground contour measurements being made.

What I have described is the technique and apparatus for establishing a horizontal reference plane with reference to which aerial surveying measurements may be made so as to determine ground contours in the survey area. The invention has been suggested and disclosed in such clear terms as to permit those skilled in the art to practice the invention. The embodiment described is provided herein by way of illustration and not of limitation. It should be noted that with reciprocal devices, the decision to place a piece of equipment either on the aircraft or on the ground is a matter determined by the preferences of the designer.

Although I have consistently used the term "horizontal reference plane" in explaining the invention, such usage should not be considered as a limitation. Instances will arise in which it will prove advisable that the reference plane be established at a tilt angle causing the plane to depart from a true horizontal reference. Final contour readings are then corrected to account for and eliminate the effects of this tilt angle. The innovative concept, however, remains the same: an aircraft is located in space and with respect ot the reference plane established. The altitude of the aircraft above ground is correlated with its position with respect to the reference plane and ground contours are then referred to that reference plane. Where an aircraft altimeter is used to determine the craft's altitude use of latest technology laser altimeters is recommended for greatest accuracy.

That which I claim is:

1. A method for aerial surveying to determine ground contours, said method comprising, in combination, the steps of:
   (a) locating a rotating-beam laser generator at a known point on the ground and rotating said laser beam to define a reference plane;
   (b) measuring the relative height of an aircraft with respect to said reference plane by sensing the location of said rotating laser beam with a stacked-array optical sensor carried by said aircraft and responsive to said beam;
   (c) establishing a survey track for said aircraft along the ground and measuring the position of said aircraft along said track;
   (d) continuously moving said aircraft along said track while simultaneously continuously measuring the altitude of said aircraft above the ground by altimeter means carried by said aircraft which are operatively independent of ground-located elements; and
   (e) correlating the relative height (b), position (c) and altitude (d) of said aircraft to determine said ground contours.

* * * * *